United States Patent
Takasugi et al.

(10) Patent No.: US 6,606,141 B2
(45) Date of Patent: Aug. 12, 2003

(54) LIQUID CRYSTAL DISPLAY DEVICE AND A MANUFACTURING METHOD THEREOF

(75) Inventors: Shinji Takasugi, Yokohama (JP); Mitsuru Ikezaki, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/682,569

(22) Filed: Sep. 20, 2001

(65) Prior Publication Data

US 2002/0036725 A1 Mar. 28, 2002

(30) Foreign Application Priority Data

Sep. 21, 2000 (JP) .......................... 2000-287410

(51) Int. Cl.[7] .............................. G02F 1/1343
(52) U.S. Cl. ................... 349/139; 349/38; 430/312
(58) Field of Search ............... 349/139, 38–42, 349/129, 123; 430/312

(56) References Cited

U.S. PATENT DOCUMENTS

| | | | | |
|---|---|---|---|---|
| 5,339,181 A | * | 8/1994 | Kim et al. ...................... | 349/38 |
| 5,528,395 A | * | 6/1996 | So .................................. | 349/42 |
| 5,710,611 A | * | 1/1998 | Suzuki et al. ................... | 349/129 |
| 5,945,256 A | * | 8/1999 | Kim et al. ...................... | 430/312 |
| 6,034,752 A | * | 3/2000 | Khan et al. ..................... | 349/74 |
| 6,226,058 B1 | * | 5/2001 | Ohi .................................. | 349/38 |
| 6,404,474 B1 | * | 6/2002 | Watanabe et al. .............. | 349/141 |

FOREIGN PATENT DOCUMENTS

| | | | |
|---|---|---|---|
| JP | 2-223926 | 9/1990 | .......... G02F/1/136 |
| JP | WO95/16276 | 6/1995 | .......... H01L/21/027 |
| JP | 11-258629 | 9/1999 | .......... G02F/1/136 |

* cited by examiner

Primary Examiner—Julie Ngo
(74) Attorney, Agent, or Firm—Derek S. Jennings

(57) ABSTRACT

Disclosed is a manufacturing method of a liquid crystal display device that prevents luminance change in a sub-pixel where exposed portions overlap each other. A substrate is dividedly exposed in patterning a TFT array substrate of a liquid crystal display device. In an exposure process of using a resist, the substrate is divided into a plurality of divided regions. The portion subjected to a double exposure is set in a nonlinear manner within the sub-pixel. By providing such an arrangement, the portion subjected to double exposure is set so as not to overlap a storage capacitor or a signal line.

11 Claims, 7 Drawing Sheets

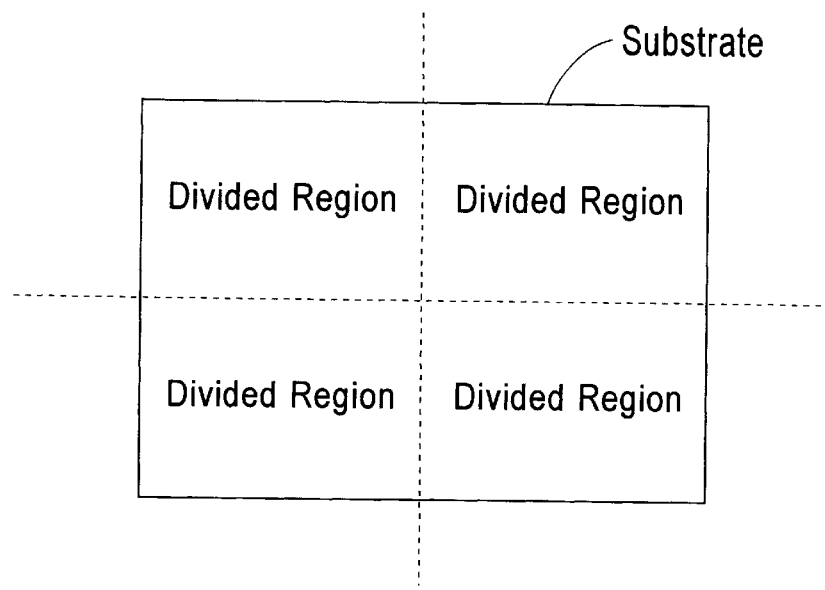
Fig. 2
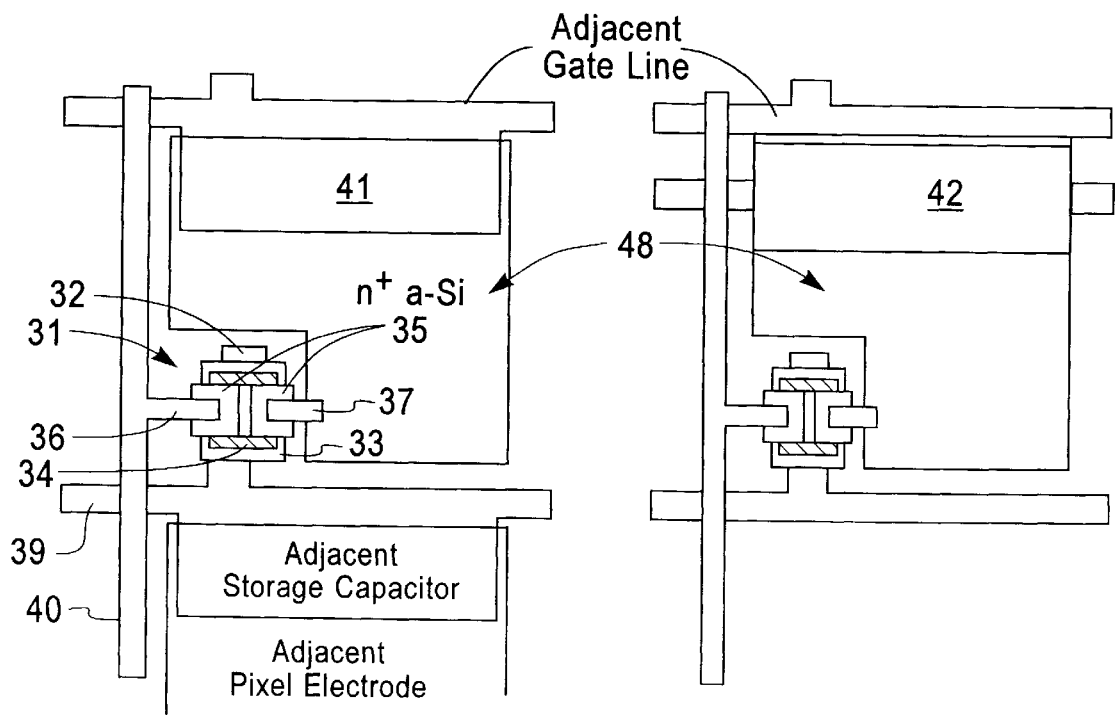
Fig. 3A　　　　　　　　Fig. 3B

LIQUID CRYSTAL DISPLAY DEVICE AND A MANUFACTURING METHOD THEREOF

BACKGROUND OF THE INVENTION

The present invention relates to a manufacturing method of a liquid crystal display device, a manufacturing method of a display device and a liquid crystal display device. More particularly, the present invention relates to a manufacturing method of a liquid crystal display device, a manufacturing method of a display device, and a liquid crystal display device, which are accompanied with improvement of a patterning process.

There has been remarkable progress in popularization of a liquid crystal display (LCD) device used as an image display device for a personal computer or other various monitors. The liquid crystal display device generally comprises: a liquid crystal display panel provided with a drive circuit; and a backlight unit arranged in a backside thereof. The display panel displays an image by controlling light transmitted there through. The display panel comprises a display region constituted of a plurality of sub-pixels arranged in a matrix layout, and an outer peripheral region formed in an outer periphery of the display region. Among the liquid crystal display devices, there is an active matrix LCD device, in which each sub-pixel has a switching element such as a thin film transistor (TFT) and a metal-insulator-metal (MIM).

Since the active matrix LCD can perform a fine gradation display and is high in contrast, it has been widely applied to a high-definition display device or a color LCD. The color LCD is typically formed by filling liquid crystal between an array substrate, in which switching elements and pixel electrodes are formed in an array fashion, and a color filter substrate with color filters. The color LCD device has color filters of R, G and B, each of which is provided for each sub-pixel, and performs a color display by controlling a quantity of light from each sub-pixel. Three sub-pixels of R, G and B from one pixel. It should be noted that each sub-pixel corresponds to one pixel in a monochrome LCD device.

FIG. 1 is a constructional view schematically showing a sub-pixel having a TFT as a switching element. Only the sub-pixel formed on a TFT substrate is shown. FIG. 1 shows a bottom gate type TFT using amorphous silicon (a-Si) as a semiconductor. Besides the above, there are a bottom gate type TFT using polysilicon as semiconductor, a top gate type TFT and the like. The bottom gate type TFT is a TFT in which a gate of the TFT is disposed below drain/source thereof.

In FIG. 1, shows a TFT 11 as a switching element, a gate electrode 12, a gate insulating layer 13, an amorphous silicon (a-Si) layer 14, an ohmic layer 15 improving an ohmic contact between the a-Si layer and electrodes, a source electrode 16, a drain electrode 17, and a pixel electrode 18 for applying an electric field to liquid crystal. In the ohmic layer 15, phosphorous or arsenic is doped as a donor. The gate electrode 12 is connected to a Y-axis-side driver IC (not shown) via a gate line 19. The source electrode 16 is connected to an X-axis-side driver IC (not shown) via a signal line 20. It should be noted that, since the TFT 11 is driven by an alternating current, the source and drain electrodes 16 and 17 are sequentially inverted. A reference numeral 21 denotes a storage capacitor improving a retention characteristic of the liquid crystal. The storage capacitor 21 utilizes the gate insulating layer as a dielectric, and is formed between the pixel electrode 18 and a part of the gate line of a sub-pixel adjacent thereto.

Elements on the array substrate are formed by deposition of materials, a photolithography process and an etching process. In the photolithography process, photoresist made of photosensitive resin is coated on the substrate. Coating on the substrate is performed by a spin-coating method or a roll-coating method. The photoresist coated on the substrate is then subjected to a pre-baking process, followed by an exposure process. The exposure is performed by irradiating the substrate with light having a specified pattern by use of a mask called a reticle. The reticle is typically a mask in which the original picture of the pattern is formed of such as chromium on a glass substrate.

As an exposure method, in general, a proximity method, a lens projection method or mirror projection method is used. The proximity method is an exposing method of disposing a substrate for exposure proximately to a mask. Each of the lens projection and mirror projection methods is a method of exposing a substrate with a mask pattern by projecting the pattern on the substrate by use of a lens or a mirror. In each projection method, a pattern on the reticle is often enlarged by about 1.25 times to be projected on a substrate.

Since the full surface of a relatively large substrate cannot be exposed once, the substrate is dividedly exposed in general. It is a method of exposing patterns on a mask onto a substrate, not by exposing the whole substrate all at once but by exposing a plurality of divided regions. Here, the substrate is disposed on an exposure stage, or the reticle is disposed on a reticle stage, and by moving these stages, the substrate and the reticle are aligned. An apparatus for exposing the divided regions as described above is generally called a stepper.

FIG. 2 is a view showing the case of exposing one circuit onto a substrate by dividing the circuit into four regions. As shown in FIG. 2, the substrate is divided into four regions, and exposure is performed sequentially for each divided region. While exposing the respective divided regions, the same reticle can be repeatedly used, or alternatively, four different reticles can be used. In the case where a circuit is exposed by dividing the plurality of divided regions, the respective divided regions are different from one another in electrical characteristics due to exposure errors during manufacturing, resulting in a problem that a quantity of transmitted light for the same electric signal differs in each divided region. Such difference of the quantity of transmitted light has sometimes been recognized as a difference of a display color among the divided regions in the color LCD.

In order to solve the problem as described above, the gazette of Japanese Patent Laid-Open No. Hei 11 (1999)-258629 and the gazette of WO No. 95/16276 have proposed that a boundary between the divided regions is made non-linear. The technologies proposed in these gazettes have an object to make a joint of the divided regions inconspicuous by zigzagging the boundary of the divided regions.

In such divisional exposure, not only the difference in the electrical characteristic for each divided region but also exposure misalignment of the mask pattern on a divisional boundary portion must be taken into consideration. An error in reticle alignment accuracy, distortion, a magnification error, an error in manufacturing a reticle and the like bring an error in jointing the respective divided regions in the divisional boundary portion. In consideration of the jointing error, double exposure is performed for the vicinity of the divisional boundary portion so that parts of the divided regions adjacent to each other overlap. The exposure misalignment causes a change of a patterned shape or a pattern position. A problem caused by the error in jointing the respective divided regions has been described in, for example, the gazette of Japanese Patent Laid-Open No. Hei 2 (1990)-223926. The change in a display characteristic caused by the jointing error becomes particularly significant on an active element such as a TFT. Therefore, the gazette has proposed that an exposure joint be set so as not to overlap the active element such as a TFT.

The inventor of the present invention found out that the setting of the TFT and the divisional boundary portion so as not to overlap each other is not sufficient for solving the problem of the exposure misalignment in the divisional boundary portion. In the conventional exposure method, the divisional boundary portion has been parallel to the signal line, and has been set so as to pass through an approximate center of the sub-pixel or to overlap the signal line. In the case where the divisional boundary portion has been set so as to overlap the signal line, capacitance between the signal line and the pixel electrode is changed. Moreover, since the TFT and the divisional boundary portion overlap each other, the characteristic of the TFT is also greatly changed.

For this reason, luminance of the sub-pixel overlapping the divisional boundary portion differs from that of the other sub-pixels, thus causing a problem of visible unevenness in the display. Moreover, in the case where the divisional boundary portion is set so as to pass through the approximate center of the sub-pixel, the divisional boundary portion overlaps a storage capacitor. Due to the exposure misalignment, the shape of a conductor portion of a gate line that constitutes the storage capacitor and the shape of the pixel electrode are changed. Therefore, the storage capacitor of the above-described sub-pixel differs from the storage capacitors of other sub-pixels that do not overlap the divisional boundary portion, thus causing unevenness in luminance.

SUMMARY OF INVENTION

A feature of the present invention applies to a manufacturing method of a liquid crystal display device, comprising the steps of: patterning a pixel electrode for applying an electric field to liquid crystal; patterning wiring for transmitting an electric signal to the foregoing pixel electrode; and patterning a conducting portion forming a storage capacitor with the foregoing pixel electrode for the purpose of improving a retention characteristic of the foregoing liquid crystal. At least part of wiring patterning processes is performed by dividing into a plurality of divided regions. A divisional boundary portion of the foregoing divided regions is set so as not to overlap at least a part of the foregoing wiring and extended in a direction of the foregoing wiring being extended. At least part of conducting portion patterning processes or pixel electrode patterning processes are performed by dividing into a plurality of divided regions. A divisional boundary portion of the foregoing divided regions is set so as not to practically overlap the foregoing storage capacitor and extended in the direction of the foregoing wiring being extended.

Another feature of the present invention applies to a manufacturing method of a display device, in which a conducting layer and an insulating layer are patterned on an insulating substrate to form a plurality of sub-pixels in a matrix layout, the foregoing method comprising the step of: patterning at least part of patterning processes are performed by dividing into a plurality of divided regions, and providing a divisional boundary portion of the foregoing divided regions such that it is set in a nonlinear manner within the foregoing sub-pixels.

Still another feature of the present invention applies to a liquid crystal display device, comprising: a pixel electrode for applying an electric field to liquid crystal; wiring for transmitting an electric signal to the foregoing pixel electrode; and a conducting portion forming a storage capacitor with the foregoing pixel electrode for the purpose of improving a retention characteristic of the foregoing liquid crystal, wherein at least part of the wiring pattering processes are performed by dividing into a plurality of divided regions, and a divisional boundary portion of the foregoing divided regions are divided and subjected to patterning as not to overlap at least a part of the foregoing wiring and extended in a direction of the foregoing wiring being extended, and at least part of the patterning processes for a conducting portion or a pixel electrode are performed by dividing into a plurality of divided regions, and a divisional boundary portion of the foregoing divided regions is set so as not to practically overlap the foregoing storage capacitor and extended in the direction of the foregoing wiring being extended.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF DRAWINGS

For a more complete understanding of the present invention and the advantages thereof, reference is now made to the following description taken in conjunction with the accompanying drawings.

FIG. 2 is a schematic view showing the divisional exposure in the background art.

FIGS. 3A and 3B are schematic views showing the structures of sub-pixels in accordance with a first embodiment of the present invention.

DETAILED DESCRIPTION

Figure 1:
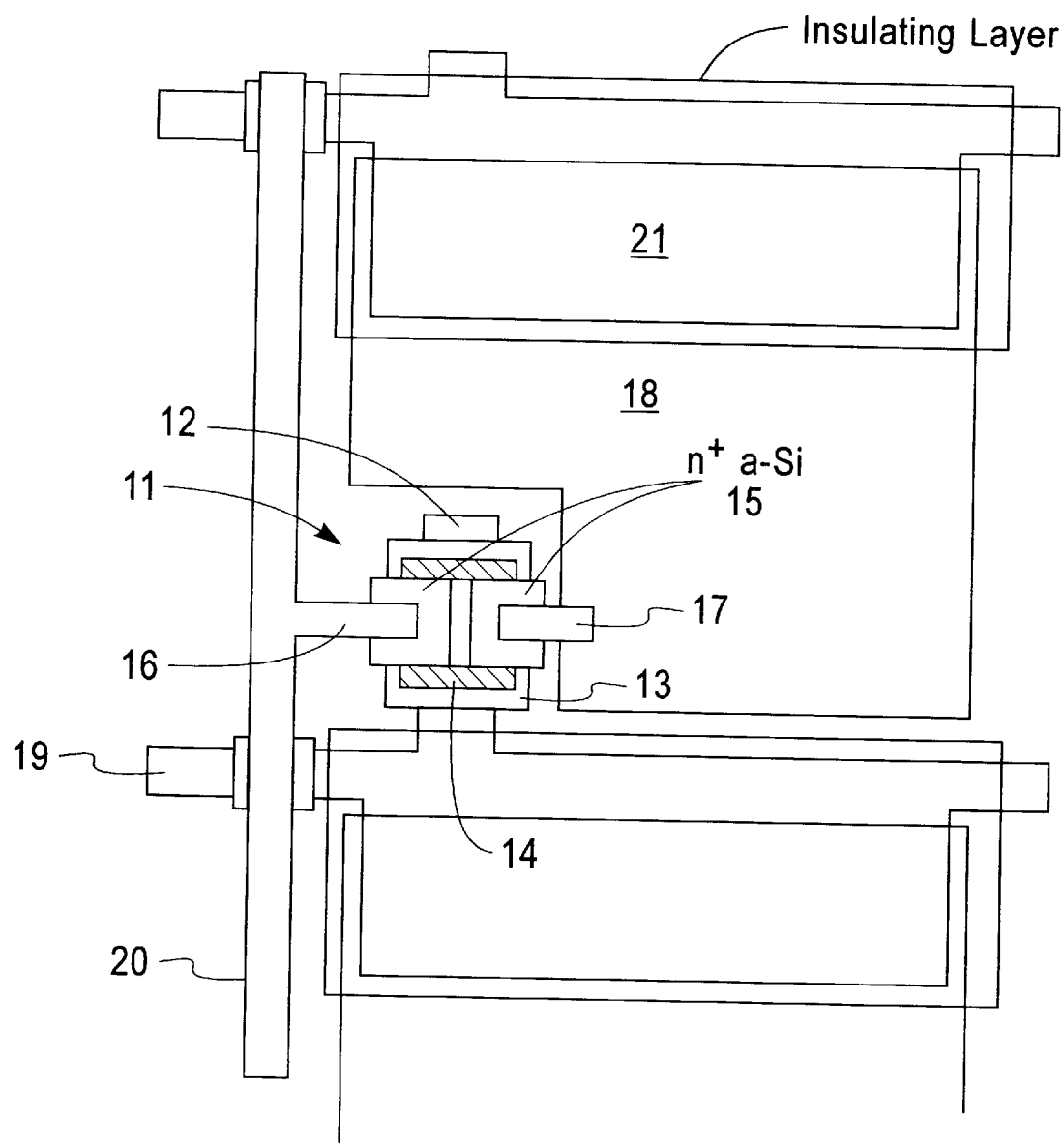
FIG. 1 is a schematic view showing the construction of a sub-pixel in the background art.

The present invention prevents luminance change in a sub-pixel where divisional boundary portions overlap each other. The present invention provides a display device, in which the divisional boundary portion is inconspicuous on a display screen, and a manufacturing method of the same. The present invention provides a display device, in which an electrical characteristic of the sub-pixel overlapping the divisional boundary portion does not greatly differ from that of the other sub-pixels, and a manufacturing method of the same. The present invention further provides a facile setting method for setting divided regions for exposure.

The present invention can prevent the luminance change in the sub-pixel where the divisional boundary portions overlap by setting the divisional boundary portions of the dividedly exposed regions within the sub-pixel in a specified range.

It is satisfactory as far as the divisional boundary portion does not practically overlap the storage capacitor, which includes the case where the luminance change caused by the change of capacitance is not visible whereas the divisional boundary portion and the storage capacitor slightly overlaps. The "patterning" refers to formation of the conducting portion or the insulating portion in a specified shape. In a typical manufacturing process of a liquid crystal display device, the patterning includes deposition of materials, a photolithography process and an etching process. The wiring for transmitting an electric signal to a pixel electrode includes both a signal line and a gate line. The liquid crystal display device includes all of the following devices such as a liquid crystal cell having liquid crystal filled between two substrates, a liquid crystal module with a driver IC and a control card mounted onto the liquid crystal cell which is combined with a backlight unit, and a liquid crystal display as a finished product.

The foregoing divisional boundary portion can be set nonlinear within a sub-pixel. By setting the divisional boundary portion nonlinear within the sub-pixel, the divisional boundary portion does not practically overlap the storage capacitor, and it is also made possible to minimize an overlap thereof with the wiring. Moreover, the foregoing divisional boundary portion may be set so as to overlap an intersection of a signal line and a gate line. Thus, the divisional boundary portion does not overlap the storage capacitor, and it is made possible to set the storage capacitor large.

The foregoing divisional boundary portion comprises: a first portion approximately parallel to the foregoing wiring, the foregoing first portion not overlapping the foregoing wiring; and a second portion formed continuously with the foregoing first portion having a specified angle with the foregoing first portion, wherein the foregoing second portion may be set at a specified angle with the foregoing first portion so as not to practically overlap the foregoing storage capacitor. Thus, the divisional boundary portion does not overlap the storage capacitor, and it is made possible to minimize the overlap thereof with the wiring.

A process performed for the foregoing divided regions is an exposure process of photosensitive resin. Then, the luminance change of the sub-pixel due to the exposure misalignment can be suppressed. Moreover, the foregoing divisional boundary portions are set identical in all of the exposure processes. Then, designing can be facilitated.

The foregoing divisional boundary portion in the foregoing wiring patterning step may be set differently from the foregoing divisional boundary portion in the foregoing conducting portion patterning step and the foregoing pixel electrode patterning step as well. Then, the divisional boundary portion does not overlap the storage capacitor, and it is also made possible to minimize the overlap thereof with the wiring.

The display device is not limited to a liquid crystal display device, but includes a self-light emitting type display or the like using a PLED (a polymer light emitting diode) or an OLED (an organic light emitting diode), which controls light emitted therefrom by operating a voltage applied to an organic polymer film.

A process performed for the foregoing plurality of divided regions may be an exposure process of photosensitive resin. Then, the luminance change within the sub-pixel due to the exposure misalignment can be suppressed.

Figure 9:
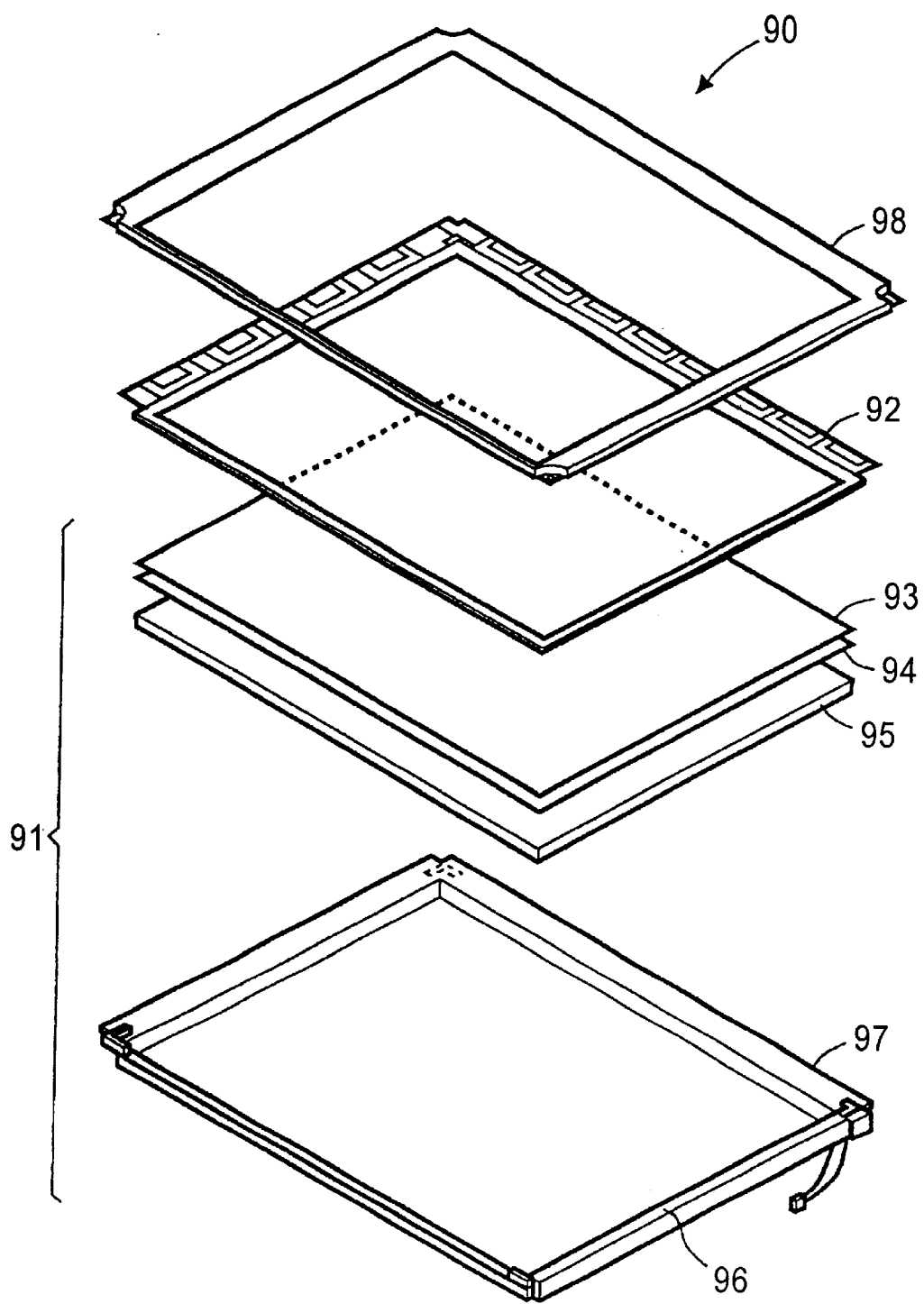
FIG. 9 is a schematic view showing a liquid crystal display device in accordance with a first embodiment of the present invention.

FIG. 9 is a constructional view schematically showing a liquid crystal display device 90 with a sidelight type backlight unit. In FIG. 9, a reference numeral 91 denotes a backlight unit; a numeral 92 a liquid crystal panel (a liquid crystal cell) with a driver IC attached thereto; and a numeral 93 a diffusion sheet diffusing light to even brightness on a surface of the liquid crystal display panel. The liquid crystal panel 92 comprises a TFT array substrate in which TFTs are formed in an array fashion, and a color filter substrate. Here, liquid crystal is filled between the two substrates. A reference numeral 94 denotes a prism sheet that condenses light to improve luminance of the front of a display.

A reference numeral 95 denotes a light guide plate guiding and diffusing light from a light source, and a numeral 96 denotes a frame accommodating parts of the backlight unit 91 such as the light guide plate and the prism sheet. A reference numeral 97 denotes a cold cathode tube as a light source, and a numeral 98 denotes a bezel holding and protecting the liquid crystal cell 92 and the backlight unit 91 from the outside. The diffusion sheet 93, the prism sheet 94, the light guide plate 95, the frame 96 and the cold cathode tube 97 constitute the backlight unit 91 as a whole. The cold cathode tube 97 is disposed inside the frame 96, and is not shown in FIG. 9.

FIG. 3 is a constructional view schematically showing a sub-pixel with a TFT as a switching element. Only the sub-pixel formed on the TFT substrate is shown. The TFT shown in FIG. 3 is a bottom gate type TFT using amorphous silicon (a-Si) as semiconductor. Besides the above, there are a bottom gate type TFT using polysilicon as semiconductor, a top gate type TFT and the like. The bottom gate type TFT is a TFT in which a gate of the TFT is disposed below source/drain thereof.

FIG. 3 includes a reference numeral 31 that denotes a TFT as a switching element, a gate electrode 32, an ohmic layer 35 improving an ohmic contact between the a-Si layer and electrodes, a source electrode 36, a drain electrode 37, and a pixel electrode 38 for applying an electric field to liquid crystal. In the ohmic layer 35, phosphorous or arsenic is doped as a donor. The gate electrode 32 is connected to a Y-axis-side driver IC via a gate line 39. The source electrode 36 is connected to an X-axis-side driver IC via a signal line 40.

It should be noted that, since the TFT 31 is driven by an alternating current, the source and drain electrodes 36 and 37 are sequentially inverted. A storage capacitor 41 improves the retention characteristic of the liquid crystal. The storage capacitor 41 utilizes the gate insulating layer as a dielectric, and is formed between the pixel electrode and a part of the gate line of a sub-pixel adjacent thereto (FIG. 3A). FIG. 3B shows an example where the storage capacitor 42 is formed independently of the gate line. A conducting portion constituting the storage capacitor 42 in FIG. 3B is formed of the same material in the same layer as the gate electrode.

An operation of the sub-pixel will be described. A signal is transmitted from the Y-axis-side driver IC via the gate line 39 to the gate electrode 32. A gate voltage of the TFT 31 is operated by the signal to turn on/off the TFT 31. Moreover, a signal is transmitted from the X-axis-side driver IC via the signal line 40 to the source electrode 36. The gate electrode 32 controls whether or not the signal is transmitted from the source electrode 36 to the drain electrode 37. Magnitude of the signal voltage to the drain electrode 32 is controlled by changing a voltage of the signal from the X-axis-side driver IC to the source electrode 36. The pixel electrode 38 receiving the signal voltage from the drain electrode 37 applies a voltage to the liquid crystal with a common electrode (not shown) formed on an opposed substrate. The voltage applied to the liquid crystal is held by the storage capacitor. Gradation display can be performed by changing the voltage applied to the liquid crystal.

An example of a manufacturing method of an array substrate with the bottom gate type TFT will now be described. First, a gate line layer is formed on a transparent insulating substrate. Next, an oxidized insulating layer ($SiO_x$) is formed. The silicon oxide layer functions as a gate insulating layer, a dielectric of the storage capacitor and an insulating layer between the gate line and the signal line. Then, an amorphous silicon (a-Si) layer is deposited. Moreover, a silicon nitride ($SiN_x$) layer as an etching protection film is formed. Thereafter, an n+a-Si layer as an ohmic layer is deposited, and the a-Si layer and the n+a-Si layer are simultaneously subjected to patterning. It should be noted that, as material for the insulating layer, either silicon nitride or silicon oxide can be used. Moreover, the oxidized insulating layer is sometimes etched to a required pattern, and sometimes is not.

The a-Si layer and the n+a-Si layer are also formed as a part of the signal line. Next, an ITO layer is formed. The ITO layer functions as the pixel electrode, and at the same time, is formed as a part of the signal line. Thereafter, an Al layer is formed. The Al layer is formed as source/drain electrodes and also as a part of the signal line. Moreover, a passivation layer is formed, followed by formation of an orientation film. In the above-described manner, an array substrate is completed. The liquid crystal cell is formed by filling the liquid crystal between the array substrate thus completed and the color filter substrate.

Each conducting portion and each insulating film are formed by deposition of materials, a photolithography process and an etching process. A process including the above is called patterning. There is also a layer that is not subjected to the photolithography process and the etching process. The deposition of material is performed by physical vapor deposition such as a sputtering method and vacuum evaporation or chemical vapor deposition such as plasma CVD. The photolithography process comprises the steps of: attaching photoresist as a photosensitive material; exposing via a mask pattern; forming a resist pattern by development; and exfoliating the resist. The etching process includes dry etching such as plasma sputtering and RIE sputtering or wet etching using an etchant. Among these processes, one suitable for each manufacturing step is selected. It should be noted that detailed description for these processes other than the exposure process would be omitted since they are widely known techniques.

Figure 4:
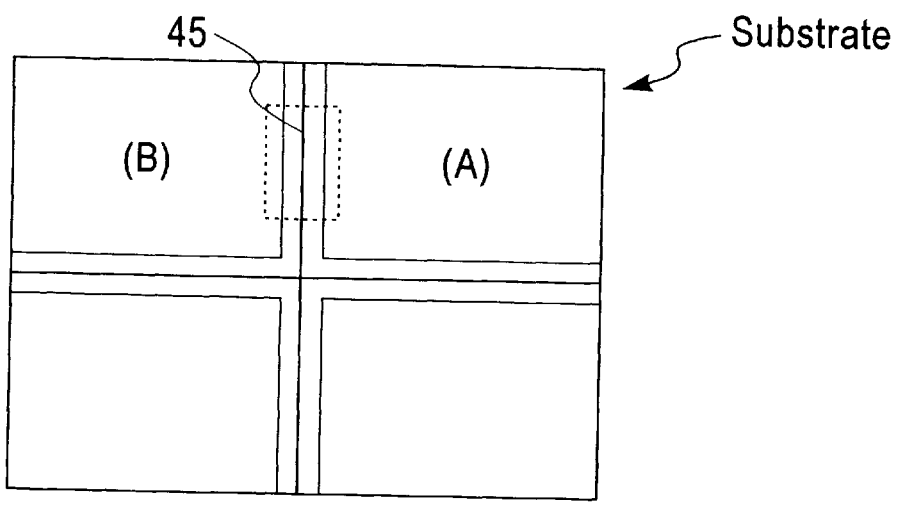
FIG. 4 is a schematic view showing the divisional exposure in accordance with the first embodiment of the present invention.
Figure 5A:
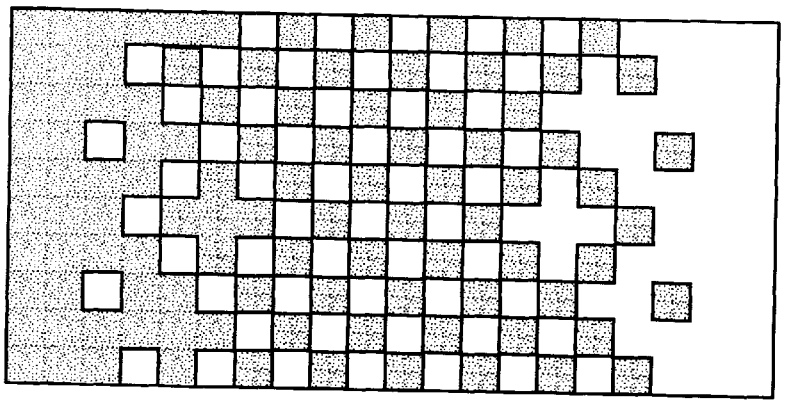
FIGS. 5A and 5B are enlarged views of regions where the divided regions overlap each other in accordance with the first embodiment of the present invention.
Figure 5B:
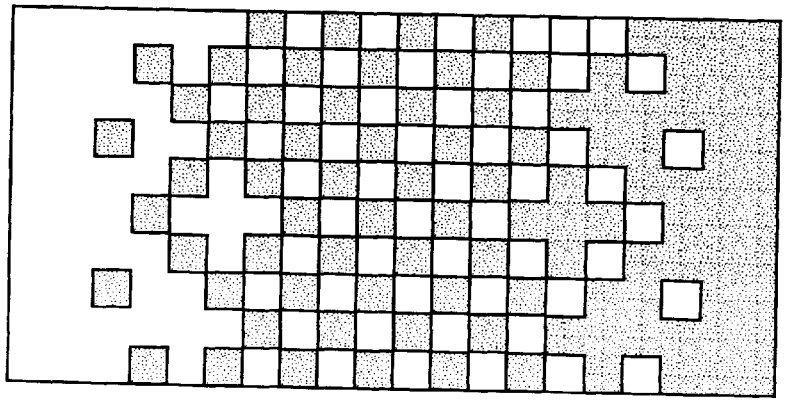

The exposure process in this embodiment will be described. FIG. 4 shows the case where one substrate is divided into four regions and four shots of exposure are performed thereof. The exposure is performed by use of a stepper. The four divided regions are exposed by reticles with patterns different from one to another. FIGS. 5A and 5B are views showing the vicinities where two dividedly exposed regions overlap each other. Here, the views are obtained by enlarging a region 45 where the divided regions in FIG. 4 overlap. Width of the region 45 where two of the dividedly exposed regions overlap is about 10 mm. FIGS. 5A and 5B correspond to regions denoted by reference codes (A) and (B) in FIG. 4, respectively. Each of FIGS. 5A and 5B show portions exposed and unexposed by one shot of exposure in the vicinity where the exposed regions overlap. Portions added with dots indicate the unexposed portions, and blank portions indicate the exposed portions.

Portions painted black in FIG. 4 indicate regions subjected to double exposure in consideration of the exposure misalignment. Width of the regions subjected to the double exposure is about 6 micrometers. Approximately central portions of the double exposed regions correspond to the divisional boundary portions. As understood from FIGS. 5A and 5B, the exposed and unexposed portions are arranged alternately in check fashion so as to form a checkered pattern. Each of the square-shaped exposed and unexposed portions has a size for three sub-pixels (one pixel). It is understood that the exposed portions in FIGS. 5A and 5B are formed to be engaged with each other, and that the full surface of the substrate is exposed when such engagement is completed. By allowing the portions where the divided regions overlap to be nonlinear as shown in FIGS. 5A and 5B, the difference of the display color (luminance) in the vicinity where the divided regions overlap can be made inconspicuous.

Figure 6:
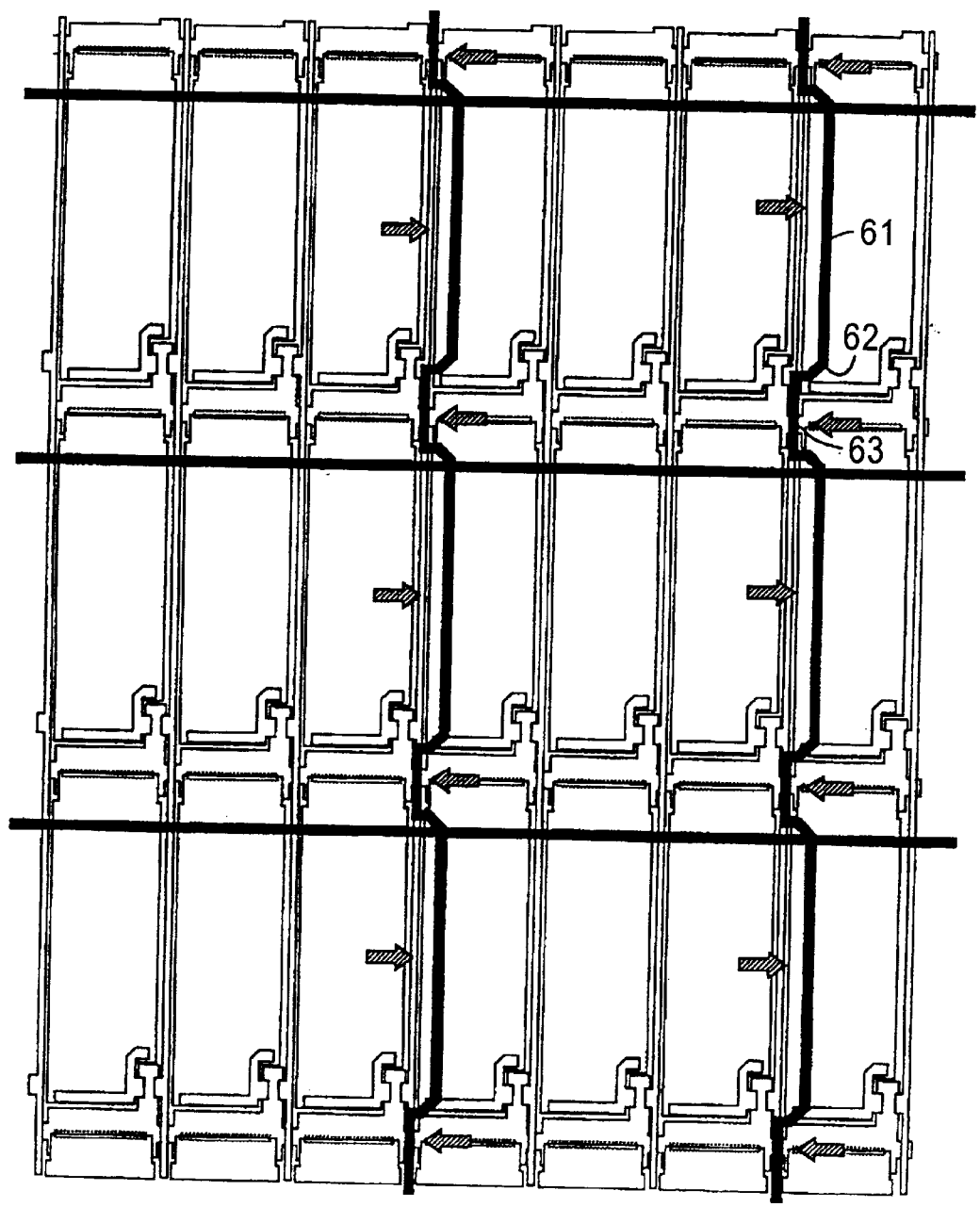
FIG. 6 is a schematic view showing the divisional boundary portions in accordance with the first embodiment of the present invention.

FIG. 6 shows divisional boundary portions in the sub-pixels. Portions painted black indicate the region subjected to double exposure. Approximately central portions of these regions are the divisional boundary portions. In the photolithography processes for all of the layers, the divisional boundary portions are set. As the divisional boundary portions, there are ones extended in a direction of the gate lines and ones extended in a direction of the signal lines. As understood from FIG. 6, the divisional boundary portions extended approximately parallel to the gate lines are set so as not to overlap the gate lines and the storage capacitors. Moreover, the divisional boundary portions extended in the direction of the signal lines are set nonlinear within the sub-pixels. The divisional boundary portions extended in the direction of the signal lines are set so as not to overlap the storage capacitors, and set so as not to overlap the signal lines as little as possible.

Each of the divisional boundary portions extended in the direction of the signal lines is constituted of: a first portion 61 extended approximately parallel to the signal line; a second portion 62 extended continuously from the first portion and bent at a specified angle before the storage capacitor; and a third portion 63 extended continuously from the second portion and overlapping an intersection of the signal line and the gate line. The first portion 61 is set so as not to overlap the signal line. The first portion 61 and the signal line are spaced by about 15 micrometers to 20 micrometers. The second portion 62 is set at a specified angle with the first portion 61 so that the divisional boundary portion does not overlap the storage capacitor. In the third portion 63, the divisional boundary portion overlaps the signal line. However, since the overlapped portion is small, it does not greatly affect the characteristic of the sub-pixel.

As described above, the divisional boundary portion does not overlap the storage capacitor in the sub-pixel and hardly overlaps the signal line. Hence, it is made possible to suppress the luminance change of the sub-pixel due to the exposure misalignment to the minimum. This is because the change of the storage capacitor, the change of capacitance between the signal line and the pixel electrode, or the characteristic change of the TFT can be suppressed. Accordingly, it is made possible to achieve the improvement in yield. Moreover, since the third portion is set so as to overlap the intersection of the signal line and the gate line, the width of the conducting portion forming the storage capacitor can be widened, and thus the accumulation capacitance can be increased. It should be noted that the divisional boundary portion may not satisfactorily overlap the storage capacitor, and that the present invention is not limited to the setting as described above. For example, in the case where the signal line and the storage capacitor are spaced by a certain distance, it is also possible to set the divisional boundary portion as a straight line passing through the space.

The present invention can be also applied in manufacturing an array substrate with top gate type TFTs. In the case of forming the conducting portion constituting the storage capacitor opposite to the pixel electrode, the divisional exposed boundary portion is set so as not overlap the storage capacitor. In addition, to the case where the storage capacitor is formed independently of the gate line, the present invention can be similarly applied. Sometimes the same reticle pattern is used for the respective divided regions. As a matter of course, besides the above-described one with the TFT, the present invention can be also applied to an active matrix type liquid crystal display device with an active element such as metal-insulator-metal (MIM). These are also applicable to another embodiment below.

Figure 7:
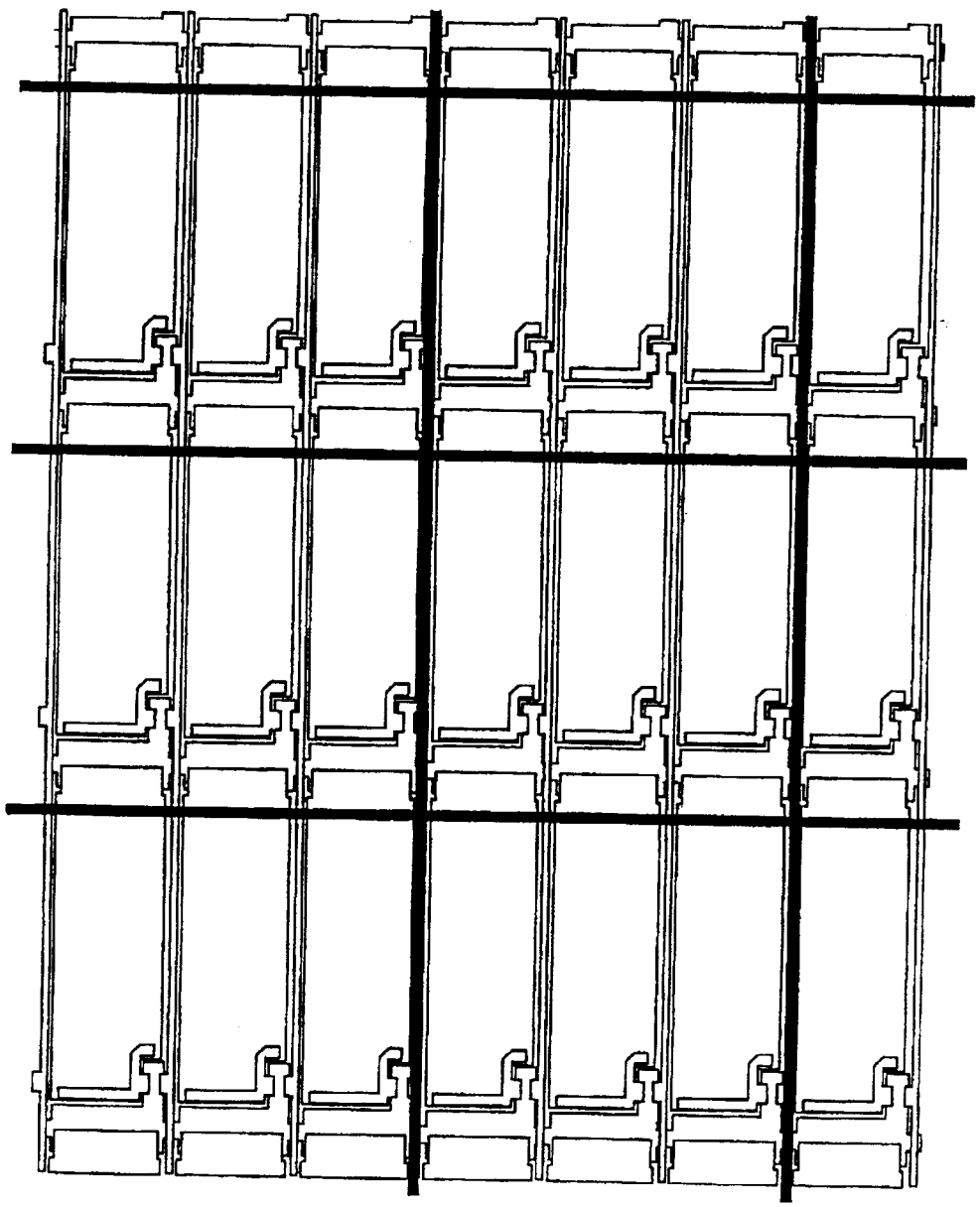
FIG. 7 is a schematic view showing the divisional boundary portions in accordance with the second embodiment of the present invention.

Now describing an example where divisional boundary portions are changed in the photolithography process for each layer. According to this embodiment, it is made possible to suppress the influence to the electric characteristic of the sub-pixel at the divisional boundary portion within the sub-pixel. The structure of the sub-pixel and the manufacturing process other than the exposure process in this embodiment are basically similar to other embodiments, and description thereof will be omitted. It should be noted that the ITO layer is not used as a constituent component of the signal line in this embodiment. FIG. 7 shows the dividedly exposed boundary portions in the photolithography process in the event of forming the gate line layer and forming the ITO pixel electrode layer. Portions painted black indicate the regions subjected to double exposure. It should be noted that, for the sake of description's convenience, FIG. 7 schematically shows the structure of the sub-pixels.

The sub-pixels have divisional boundary portions extended in a direction of the gate lines and divisional boundary portions extended in a direction of the signal lines. Each divisional boundary portion extended in the direction of the signal line is set as a straight line within the sub-pixel. The divisional boundary line overlaps the signal line, is set parallel thereto, and is set so as not to overlap the storage capacitor. In the formation of the gate line layer, a conducting portion forming the storage capacitor with the pixel electrode is formed, and the conducting portion and the divisional boundary portion are set so as not to overlap each other. The divisional boundary portion extended in the direction of the gate line is set so as not to overlap the gate line and the storage capacitor, and is extended approximately parallel to the gate line.

Figure 8:
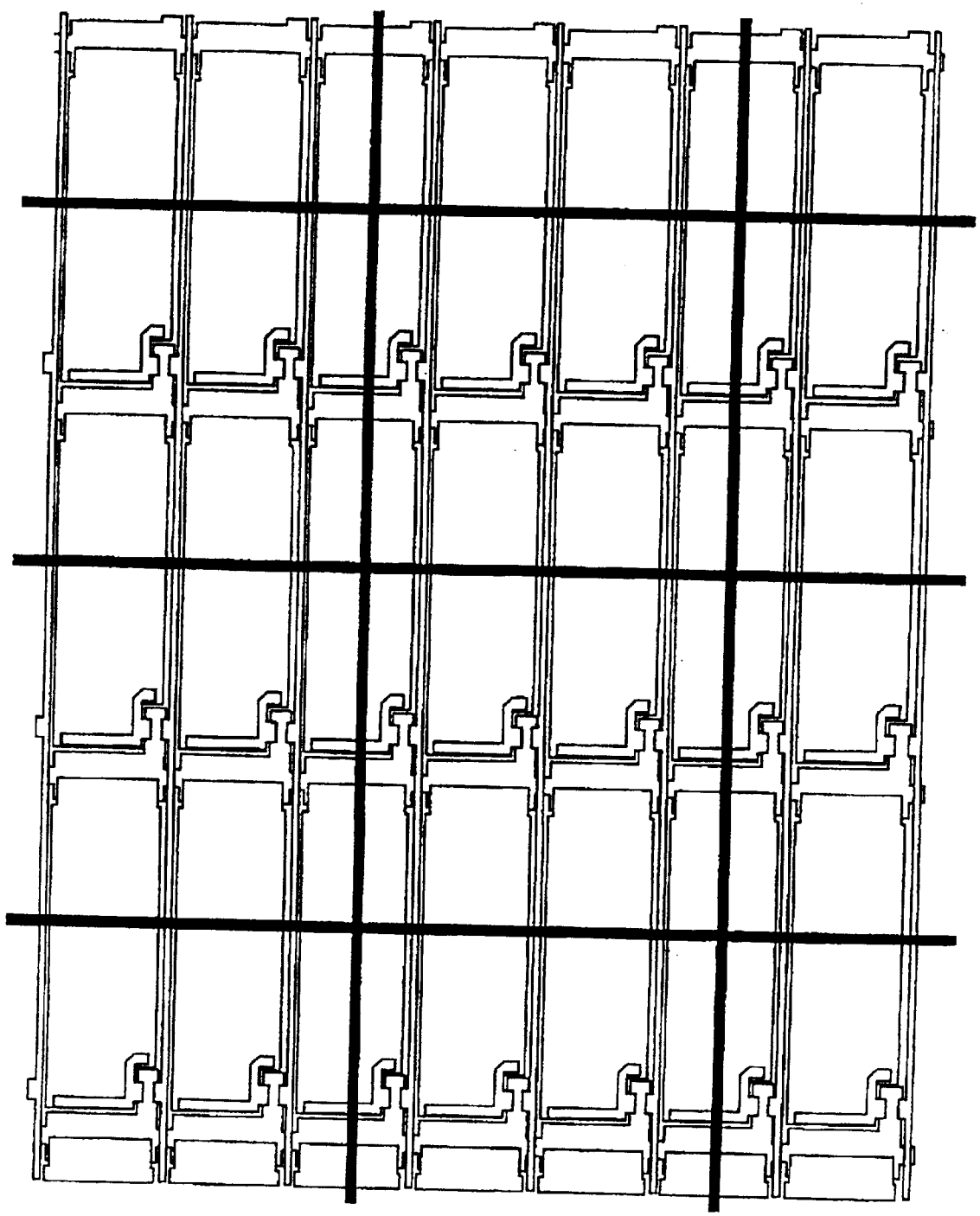
FIG. 8 is a schematic view showing the divisional boundary portions in accordance with the second embodiment of the present invention.

FIG. 8 shows dividedly exposed boundary portions in the event of forming signal lines. Each divisional boundary portion extended in a direction of the signal line is set as a straight line within the sub-pixel so as not overlap the signal line, and passes through an approximately central portion of the sub-pixel. In this embodiment, the exposure process is performed in patterning the silicon layer and the Al layer in accordance with the divided regions. Each divisional boundary portion intersects the storage capacitor. However, the exposure misalignment during the formation of the signal lines does not affect the storage capacitors in this embodiment. Therefore, no problem occurs.

As described above, by changing the divided regions in accordance with the forming processes of the respective layers, it is made possible to suppress the change of the sub-pixels in characteristic and luminance due to the exposure misalignment. Hence, the yield can be increased. Moreover, since the divided regions are changed in accordance with the forming processes of the respective layers, the divisional boundary portions within the sub-pixels can be set as straight lines in the respective exposure processes. It should be noted that, in the patterning for the pixel electrodes and the patterning for the gate line layers, it is possible to set different divisional boundary portions. Moreover, for example, in the case where the portion of the pixel electrode, which constitutes the storage capacitor, has a width wider than a width of another conducting portion (a length in the direction of the gate line), an effect of suppressing the change of the storage capacitors can be expected also in the case where the divisional boundary portions overlap the storage capacitors. This is because the storage capacitors are not changed even if the width of the pixel electrodes is changed by exposure misalignment.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the embodiments described above, but encompasses any and all embodiments within the scope of the following claims:

What is claimed is:

1. A manufacturing method of a liquid crystal display device, in use of divisional exposure including dividing a substrate into the plurality of regions, defining overlapped exposed region containing a divisional boundary portion between the divided regions, and exposing said overlapped exposed region by reticles of which a portion corresponding to said overlapped exposed region has the exposed and unexposed patterns arranged alternately in checker fashion;

said method comprising the steps of:
    patterning a pixel electrode for applying an electric field to liquid crystal;
    patterning wiring for transmitting an electric signal to said pixel electrode; and
    patterning a conducting portion forming a storage capacitor therewith said pixel electrode for the purpose of improving a retention characteristic of said liquid crystal,
    wherein, at least part of patterning processes step is performed by using said divisional exposure, and double exposure regions defined by a misalignment between the exposed patterns of two reticles positioned on said overlapped exposed region the substrate are set so as not to overlap at least a part of said wiring along said pixel electrode and extended in a direction of said wiring being extended, and at least part of said conducting portion patterning and said pixel electrode patterning steps are performed by using said divisional exposure, and said double exposure regions are set so as not to substantially overlap said storage capacitor and extended in a direction of said wiring being extended.

2. The manufacturing method according to claim 1, further comprising the step of setting at least one of said divisional boundary portion in a nonlinear manner within a sub-pixel.

3. The manufacturing method according to claim 1, further comprising the step of setting at least one of said divisional boundary portion so as to overlap an intersection of a signal fine and a gate line.

4. The manufacturing method according to claim 1, further comprising the step of providing at least one of said divisional boundary portion with:
   a first portion approximately parallel to said wiring, said first portion not overlapping said wiring; and
   a second portion formed continuously with said first portion at a specified angle with said first portion, and
   said second portion is set at a specified angle with said first portion so as not to practically overlap said storage capacitor.

5. The manufacturing method according to claim 1, wherein said patterning steps are exposure processes of photosensitive resin.

6. The manufacturing method according to claim 5, further comprising the step of selling said divisional boundary portion identical in all of the exposure processes.

7. The manufacturing method according to claim 1, further comprising the step of setting said divisional boundary portion in said wiring patterning step different from said divisional boundary portion in said conducting portion patterning step and said pixel electrode patterning step.

8. The manufacturing method of a liquid crystal display device according to claim 1, wherein, in said conducting portion patterning step and said pixel electrode patterning step, at least part of patterning processes are performed by dividing into a plurality of divided regions, and a divisional boundary portion of said divided regions is set so as not to practically overlap said storage capacitor and extended in the direction of said wiring being extended.

9. The manufacturing method according to claim 1, further comprising the steps of:
   using said wiring is a signal line;
   forming said conducting portion continuously with a gate line;
   providing at least one of said divisional boundary portions with:
      a first portion extended approximately parallel to said signal line within a sub-pixel; and
      a second portion formed continuously with said first portion at a specified angle with said first portion,
      said second portion is set at a specified angle with said first portion so as not to practically overlap said storage capacitor; and
      setting said divisional boundary portion so as to overlap an intersection of said gate line and said signal line.

10. The manufacturing method according to claim 9, wherein said step of providing said divisional boundary portion further comprises the step of providing a divisional boundary portion extended approximately perpendicular to said wiring and set so as not to practically overlap said conducting portion and said gate line.

11. A liquid crystal display device, comprising:
   a pixel electrode for applying an electric field to liquid crystal;
   wiring for transmitting an electric signal to said pixel electrode; and
   a conducting portion forming a storage capacitor with said pixel electrode for the purpose of improving a retention characteristic of said liquid crystal,
   wherein at least part of a patterning processes is performed by uses divisional exposure, and double exposure regions defined by a misalignment between the exposed patterns of two reticles positioned on overlapped exposed region of the substrate are set so as not to overlap at feast a part of said wiring along said pixel electrode and extended in a direction of said wiring being extended, and
   at least part of said conducting portion patterning and said pixel electrode patterning are performed by using said divisional exposure, and said double exposure regions are set so as not to substantially overlap said storage capacitor and extended in a direction of said wiring being extended.

* * * * *